United States Patent
Lee et al.

(10) Patent No.: US 12,148,379 B2
(45) Date of Patent: Nov. 19, 2024

(54) DISPLAY DEVICE AND DRIVING METHOD THEREOF

(71) Applicant: AUO Corporation, Hsinchu (TW)

(72) Inventors: June Woo Lee, Hsinchu (TW); Yang-En Wu, Hsinchu (TW); Sung-Yu Su, Hsinchu (TW); Yu-Chieh Kuo, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 17/982,535

(22) Filed: Nov. 8, 2022

(65) Prior Publication Data

US 2023/0222975 A1    Jul. 13, 2023

(30) Foreign Application Priority Data

Jan. 7, 2022 (TW) ................... 111100791

(51) Int. Cl.
*G09G 3/3233* (2016.01)

(52) U.S. Cl.
CPC ..... *G09G 3/3233* (2013.01); *G09G 2310/027* (2013.01); *G09G 2320/0233* (2013.01)

(58) Field of Classification Search
CPC ............. G09G 2320/0233; G09G 3/32; G09G 3/3233; G09G 2310/027
See application file for complete search history.

(56) References Cited

U.S. PATENT DOCUMENTS

| | | |
|---|---|---|
| 9,336,720 B2 | 5/2016 | Liu |
| 10,847,077 B2 | 11/2020 | Sakariya et al. |
| 11,138,918 B2 | 10/2021 | Sakariya et al. |
| 11,403,993 B2 | 8/2022 | Kuo et al. |
| 2018/0182279 A1 | 6/2018 | Sakariya et al. |
| 2021/0118353 A1 | 4/2021 | Sakariya et al. |
| 2022/0059010 A1 | 2/2022 | Sakariya et al. |

FOREIGN PATENT DOCUMENTS

| | | | | |
|---|---|---|---|---|
| CN | 102568385 | * | 7/2012 | ............... G09G 3/34 |
| CN | 107735832 |   | 2/2018 | |
| TW | 201251503 A | * | 6/2012 | ............ H05B 45/48 |
| TW | 740653 |   | 9/2021 | |

* cited by examiner

*Primary Examiner* — Nelson M Rosario
*Assistant Examiner* — Scott D Au
(74) *Attorney, Agent, or Firm* — JCIPRNET (57) ABSTRACT

A display device and a driving method thereof are provided. The display device includes a display panel, a controller, and a driver. The display panel includes a plurality of light-emitting elements. The controller receives characteristic information of the light-emitting elements, and obtains a first relationship curve between current density information and luminous efficiency information according to the characteristic information. The controller obtains a second relationship curve between duty cycle information and accumulated current consumption information or accumulated power consumption information according to the first relationship curve. The controller finds a selected duty cycle corresponding to a maximum luminous efficiency according to the second relationship curve. The driver activates the light-emitting elements according to the selected duty cycle.

14 Claims, 7 Drawing Sheets

DISPLAY DEVICE AND DRIVING METHOD THEREOF

CROSS-REFERENCE TO RELATED APPLICATION

This application claims the priority benefit of Taiwanese application no. 111100791, filed on Jan. 7, 2022. The entirety of the above-mentioned patent application is hereby incorporated by reference herein and made a part of this specification.

BACKGROUND

Technical Field

The disclosure relates to a driving technique, and particularly relates to a display device and a driving method thereof.

Description of Related Art

In a conventional display device, a luminous brightness of a light-emitting element is usually adjusted by means of pulse width modulation (PWM) control or pulse amplitude modulation (PAM) control. However, compared to using the PAM control to drive the display panel, the PWM control enables the display panel to have better luminous efficiency. On the other hand, the PAM control has advantages of simple circuit design and simple driving method.

Therefore, how to effectively improve the luminous efficiency of the display device that drives the display panel by means of PAM control is an important subject for those skilled in the art.

SUMMARY

The disclosure is directed to a display device and a driving method thereof, which are adapted to effectively improve luminous efficiency of a display device that drives a display panel by means of PAM control.

An embodiment of the disclosure provides a display device including a display panel, a controller and a driver. The display panel includes a plurality of light-emitting elements. The controller is coupled to the display panel, where the controller is configured to: receive characteristic information of the light-emitting element, and obtain a first relationship curve between current density information and luminous efficiency information according to the characteristic information; obtain a second relationship curve between duty cycle information and accumulated current consumption information or accumulated power consumption information according to the first relationship curve, and find a selected duty cycle corresponding to a maximum luminous efficiency according to the second relationship curve. The driver is coupled to the controller and the display panel, and activates each of the light-emitting elements according to the selected duty cycle.

An embodiment of the disclosure provides a driving method of a display device, which includes the following. A display panel having a plurality of light-emitting elements is provided. By a controller, characteristic information of the light-emitting elements is received, and a first relationship curve between current density information and luminous efficiency information is obtained according to the characteristic information. By the controller, a second relationship curve between duty cycle information and accumulated current consumption information or accumulated power consumption information is obtained according to the first relationship curve. By the controller, a selected duty cycle corresponding to a maximum luminous efficiency is found according to the second relationship curve. By a driver, each of the light-emitting elements is activated according to the selected duty cycle.

Based on the above description, in the display device and the driving method thereof according to the embodiments of the disclosure, the controller may find out the selected duty cycle corresponding to the maximum luminous efficiency of the display panel by converting the relationship curve associated with the characteristic information according to the characteristic information of the display panel. In this way, the driver may drive the display panel according to the selected duty cycle, so as to regulate a light-emitting time of the display panel in a light-emitting phase, thereby improving the luminous efficiency of the display device.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

A term "couple" used in the full text of the disclosure (including the claims) refers to any direct and indirect connections. For example, if a first device is described to be coupled to a second device, it is interpreted as that the first device is directly coupled to the second device, or the first device is indirectly coupled to the second device through other devices or connection means. Moreover, wherever possible, components/members/steps using the same referential numbers in the drawings and description refer to the same or like parts. Components/members/steps using the same referential numbers or using the same terms in different embodiments may cross-refer related descriptions.

Figure 1:
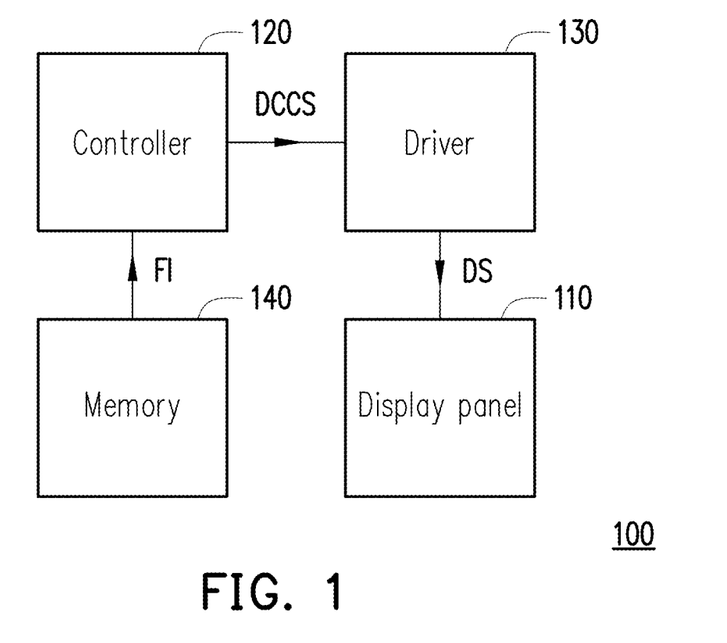
FIG. 1 is a schematic diagram illustrating a display device according to an embodiment of the disclosure.

FIG. 1 is a schematic diagram illustrating a display device according to an embodiment of the disclosure. Referring to FIG. 1, a display device 100 includes a display panel 110, a controller 120, a driver 130 and a memory 140. Wherein, the driver 130 in the embodiment may adjust a luminous brightness of the display panel 110 by means of pulse amplitude modulation (PAM) control, but the disclosure is not limited thereto.

Figure 2:
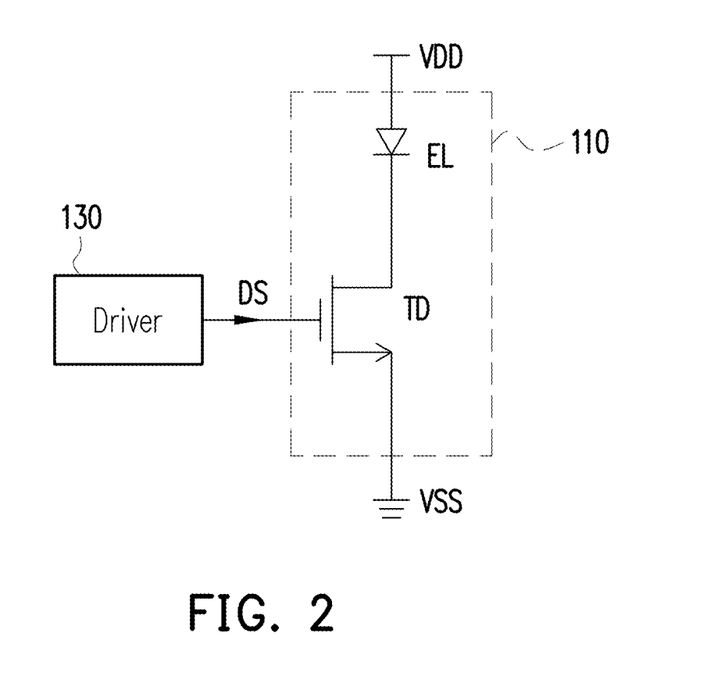
FIG. 2 is a partial schematic diagram of the display panel according to the embodiment of FIG. 1 of the disclosure.

In the embodiment, the display panel 110 has a plurality of light-emitting elements. In this regard, referring to FIG. 1 and FIG. 2 at the same time, FIG. 2 is a partial schematic diagram of the display panel according to the embodiment of FIG. 1 of the disclosure. For the convenience of description, FIG. 2 only shows some elements of a pixel circuit in the display panel 110. Specifically, the pixel circuit in the display panel 110 includes a light-emitting element EL and a driving transistor TD. A first terminal (i.e., a source terminal) of the driving transistor TD is coupled to a system low voltage VSS, and a second terminal (i.e., a drain terminal) of the driving transistor TD is coupled to a cathode terminal of the light-emitting element EL. A control terminal (i.e., a gate terminal) of the driving transistor TD is coupled to the driver 130 to receive a driving signal DS. An anode terminal of the light-emitting element EL is coupled to a system high voltage VDD. The light-emitting element EL may be, for example, an organic light-emitting diode (OLED), a light-emitting diode (LED), or other light-emitting elements, which is not particularly limited in the disclosure.

Referring back to FIG. 1, in the embodiment, the memory 140 is coupled to the controller 120. The memory 140 may be, for example, a resistive random-access memory (RRAM), a ferroelectric RAM (FeRAM), a magnetoresistive RAM (MRAM), a phase change RAM (PRAM), a conductive bridge RAM (CBRAM), any type of fixed or removable RAM, read-only memory (ROM) or flash memory (flash memory).

Specifically, during a manufacturing process of the display device 100, the display device 100 may pre-store characteristic information FI of a plurality of light-emitting elements in the display panel 110 through the memory 140. For example, the characteristic information FI may be, for example, current density information, luminous efficiency information, panel brightness information, grayscale value information, current consumption information, power consumption information, accumulated current consumption information and accumulated power consumption information associated with the light-emitting elements (for example, the light-emitting element EL).

In the embodiment, the controller 120 is coupled between the driver 130 and the memory 140. The controller 120 may receive the characteristic information FI from the memory 140, and find out a selected duty cycle DCT corresponding to a maximum luminous efficiency of the display panel 110 according to the characteristic information FI. Then, the controller 120 may generate a duty cycle control signal DCCS according to the selected duty cycle DCT.

On the other hand, the driver 130 is coupled between the display panel 110 and the controller 120. The driver 130 may generate the driving signal DS according to the duty cycle control signal DCCS, and drive the display panel 110 through the driving signal DS to activate the plurality of light-emitting elements in the display panel 110.

Figure 3:
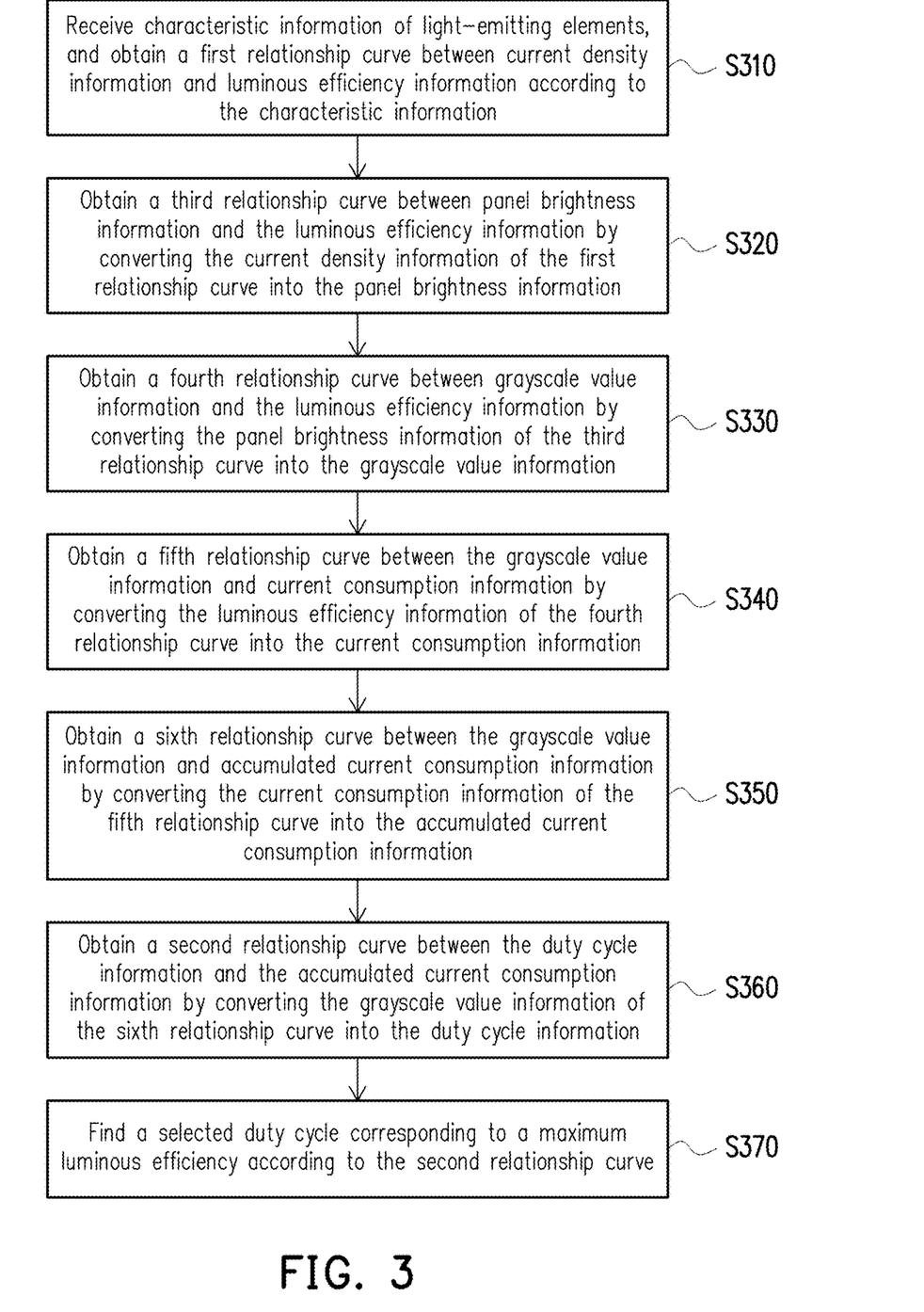
FIG. 3 is a flowchart of an operation method of a controller according to the embodiment of FIG. 1 of the disclosure.

Referring to FIG. 1 to FIG. 4F at the same time for implementation details of the display device 100. FIG. 3 is a flowchart of an operation method of the controller according to the embodiment of FIG. 1 of the disclosure, and FIG. 4A to FIG. 4F are schematic diagrams of a plurality of relationship curves according to the embodiment of FIG. 1 of the disclosure.

Figure 4A:
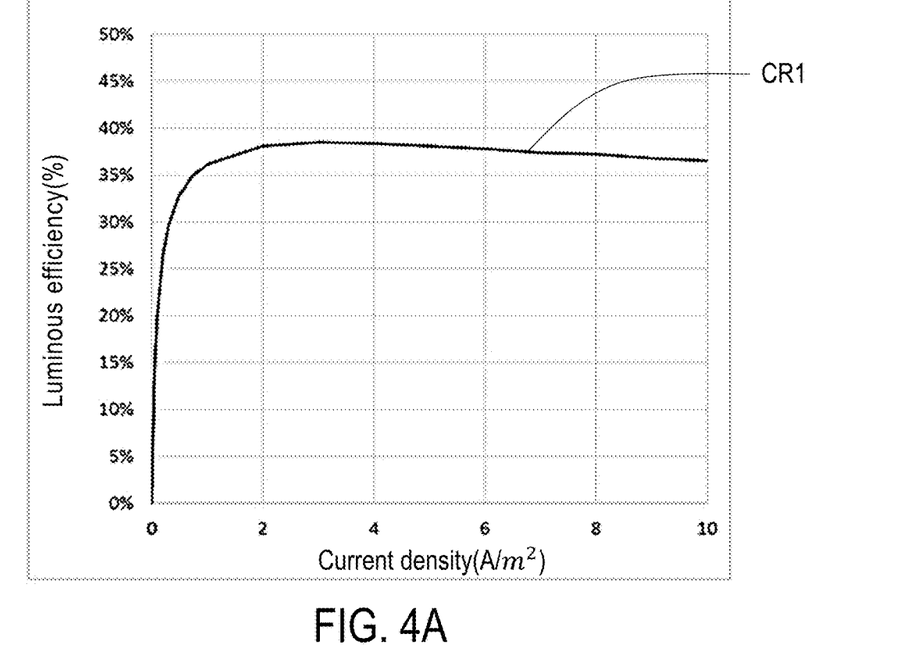
FIG. 4A to FIG. 4F are schematic diagrams of a plurality of relationship curves according to the embodiment of FIG. 1 of the disclosure.

In detail, in step S310, the controller 120 may first receive the characteristic information FI from the memory 140, and obtain a first relationship curve CR1 (as shown in FIG. 4A) between current density information CD and luminous efficiency information EC of the display panel 110 according to the characteristic information FI. The controller 120 may calculate the luminous efficiency information EC according to a following formula (1):

$$EC = \frac{\text{Instantaneous brightness of display panel}}{\text{Instantaneous current density of display panel operating in light-emitting phase}} \quad (1)$$

Figure 4B:
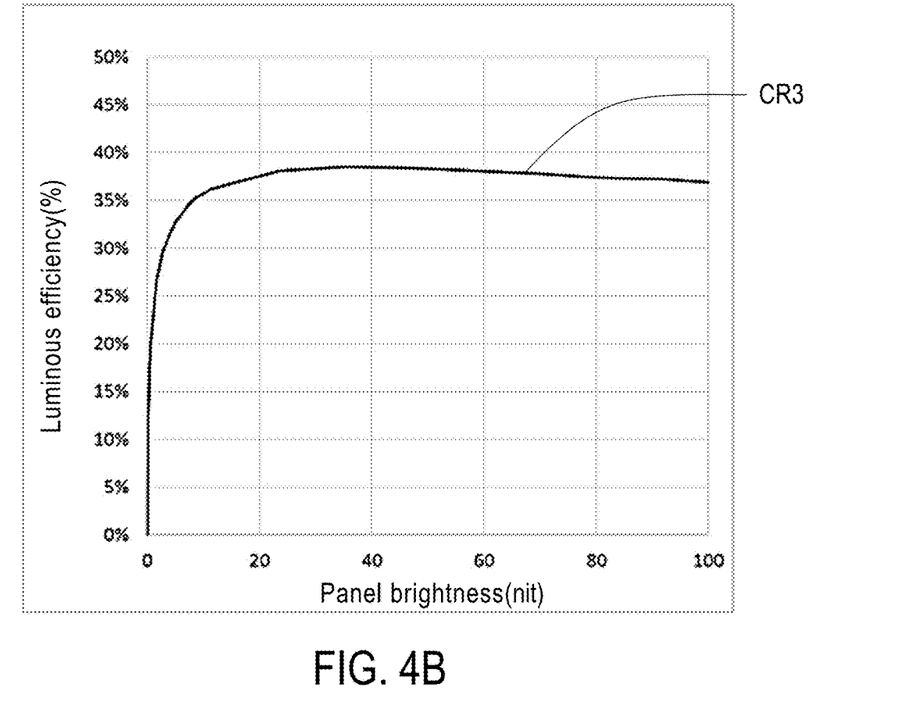

Then, in step S320, the controller 120 may convert the current density information CD of the first relationship curve CR1 (X-axis information in FIG. 4A) into panel brightness information PB, and maintain the luminous efficiency information EC of the first relationship curve CR1 (Y-axis information perpendicular to the X-axis in FIG. 4A) to obtain a third relationship curve CR3 between the panel brightness information PB and the luminous efficiency information EC (as shown in FIG. 4B). The controller 120 may calculate the panel brightness information PB according to a following formula (2):

$$PB = (CD*EC)*\frac{\text{luminous area of display panel}}{\text{pixel area}}*\text{duty cycle} \quad (2)$$

Figure 4C:
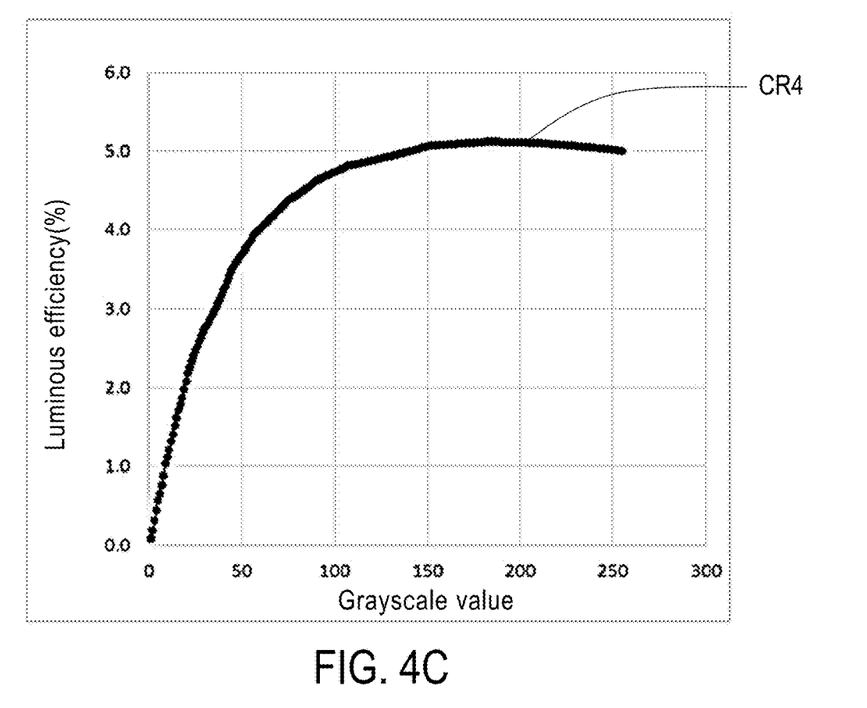

In step S330, the controller 120 may convert the panel brightness information PB of the third relationship curve CR3 (the X-axis information in FIG. 4B) into grayscale value information GS, and maintain the luminous efficiency information EC of the third relationship curve CR3 (the Y-axis information of in FIG. 4B) to obtain a fourth relationship curve CR4 between the grayscale value information GS and the luminous efficiency information EC (as shown in FIG. 4C). The controller 120 may calculate the grayscale value information GS according to a following formula (3):

$$GS = \left(\frac{PB}{\text{brightness of the display panel displaying full white}}\right)^{\frac{1}{gamma\ value}} * \text{grayscale value of display panel displaying full white} \quad (3)$$

Figure 4D:
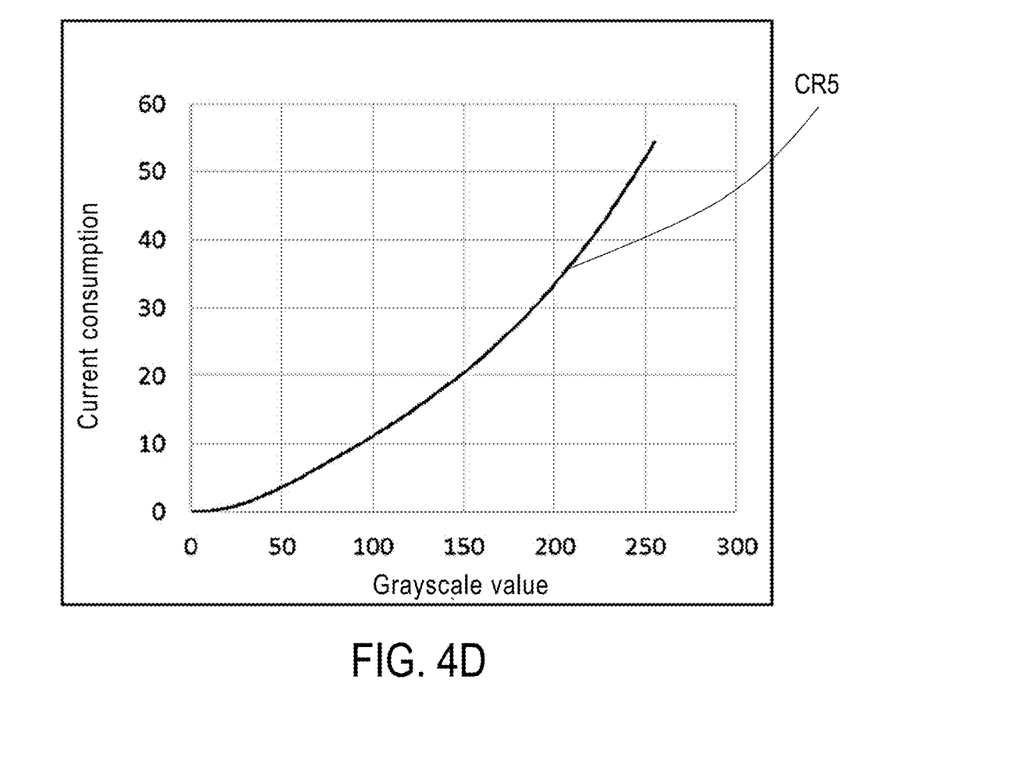

Then, in step S340, the controller 120 may convert the luminous efficiency information EC of the fourth relationship curve CR4 (the Y-axis information in FIG. 4C) into current consumption information CC, and maintain the grayscale value information GS of the fourth relationship curve CR4 (the X-axis information in FIG. 4C) to obtain a fifth relationship curve CR5 (as shown in FIG. 4D) between the grayscale value information GS and the current consumption information CC. The controller 120 may calculate the current consumption information CC of the display panel 110 in a grayscale state according to a following formula (4):

$$CC = \frac{1}{EC \text{ in } grayscal \text{ state}} * \text{brightness of display panel displaying full white} * \left(\frac{GS}{\text{grayscale value of display panel displaying full white}}\right)^{gamma\ value} \quad (4)$$

Figure 4E:
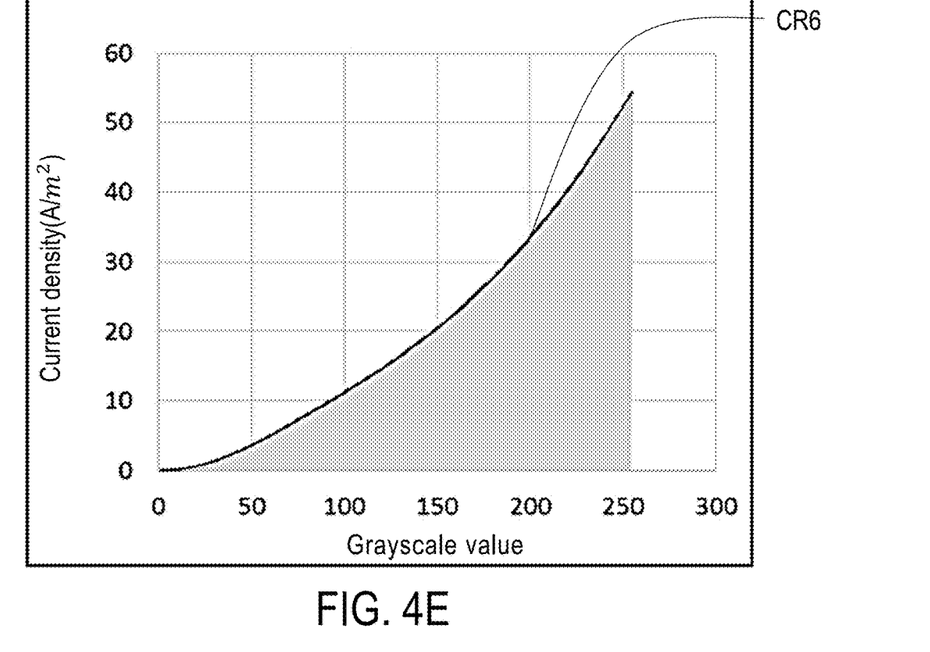

On the other hand, in step S350, the controller 120 may convert the current consumption information CC of the fifth relationship curve CR5 (the Y-axis information in FIG. 4D) into accumulated current consumption information ACC, and maintain the grayscale value information GS of the fifth $$PC = \frac{\text{driving voltage of display panel}}{EC \text{ in grayscale state}} * \left[ \begin{array}{c} \text{brightness of display panel} \\ \text{displaying full white} \end{array} * \left( \frac{GS}{\text{grayscale value of display panel displaying full white}} \right)^{gamma\ value} \right] \quad (6)$$

the relationship curve CR5 (the X-axis information in FIG. 4D) to obtain a sixth relationship curve CR6 (as shown in FIG. 4E) between the grayscale value information GS and the accumulated current consumption information ACC. The controller 120 may calculate the accumulated current consumption information ACC of the display panel 110 according to a following formula (5):

$$ACC = \Sigma_1^{grayscale\ value\ of\ display\ panel\ displaying\ full\ white} (CC \text{ of display panel in grayscale state}) \quad (5)$$

It should be noted that, as shown in FIG. 4E, the controller 120 may obtain the accumulated current consumption information ACC by calculating an area formed by the grayscale value information GS (the X-axis information) and the current density information CD (the Y-axis information).

Figure 4F:
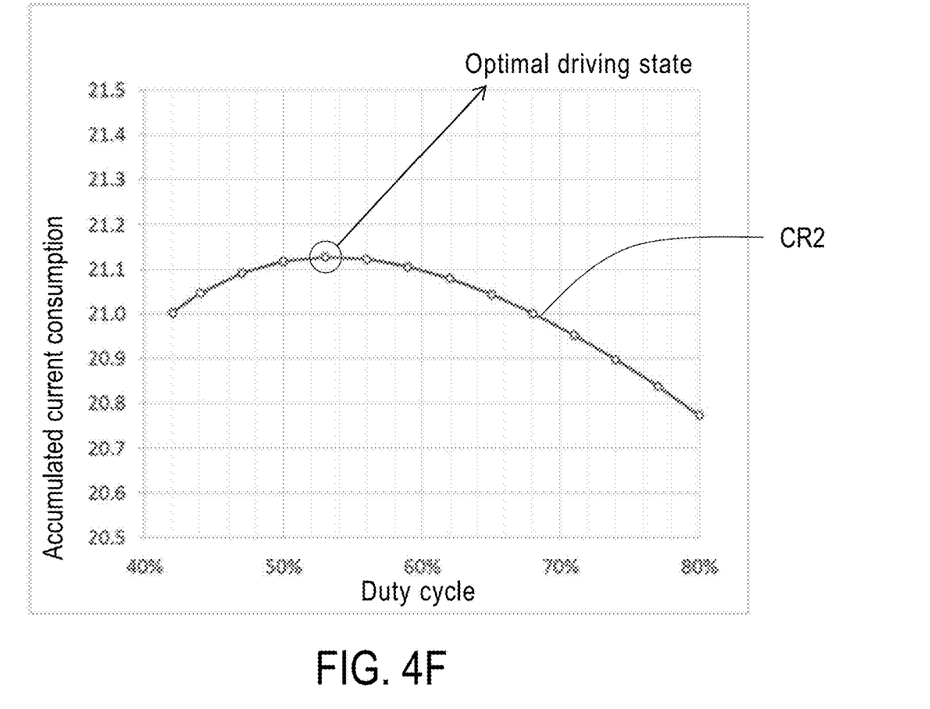

Then, in step S360, the controller 120 may convert the grayscale value information GS of the sixth relationship curve CR6 (the X-axis information in FIG. 4E) into the duty cycle information DT of the display panel 110 in the light-emitting phase to obtain a second relationship curve CR2 between the duty cycle information DT and the accumulated current consumption information ACC (as shown in FIG. 4F).

Further, in step S370, the controller 120 may find out a node corresponding to the highest position of the second relationship curve CR2 according to the second relationship curve CR2 obtained in step S360. The node may correspond to the selected duty cycle DCT of the maximum luminous efficiency of the display panel 110 in the light-emitting phase. Moreover, the controller 120 may generate the duty cycle control signal DCCS according to the selected duty cycle DCT. The selected duty cycle DCT may be represented as a duty cycle corresponding to the display panel 110 operating in an optimal driving state.

In this way, the driver 130 may provide the driving signal DS to the driving transistor TD according to the duty cycle control signal DCCS, so as to regulate a light-emitting time of the light-emitting element EL according to the selected duty cycle DCT, thereby enhancing the luminous efficiency of the display panel 110.

Figure 5:
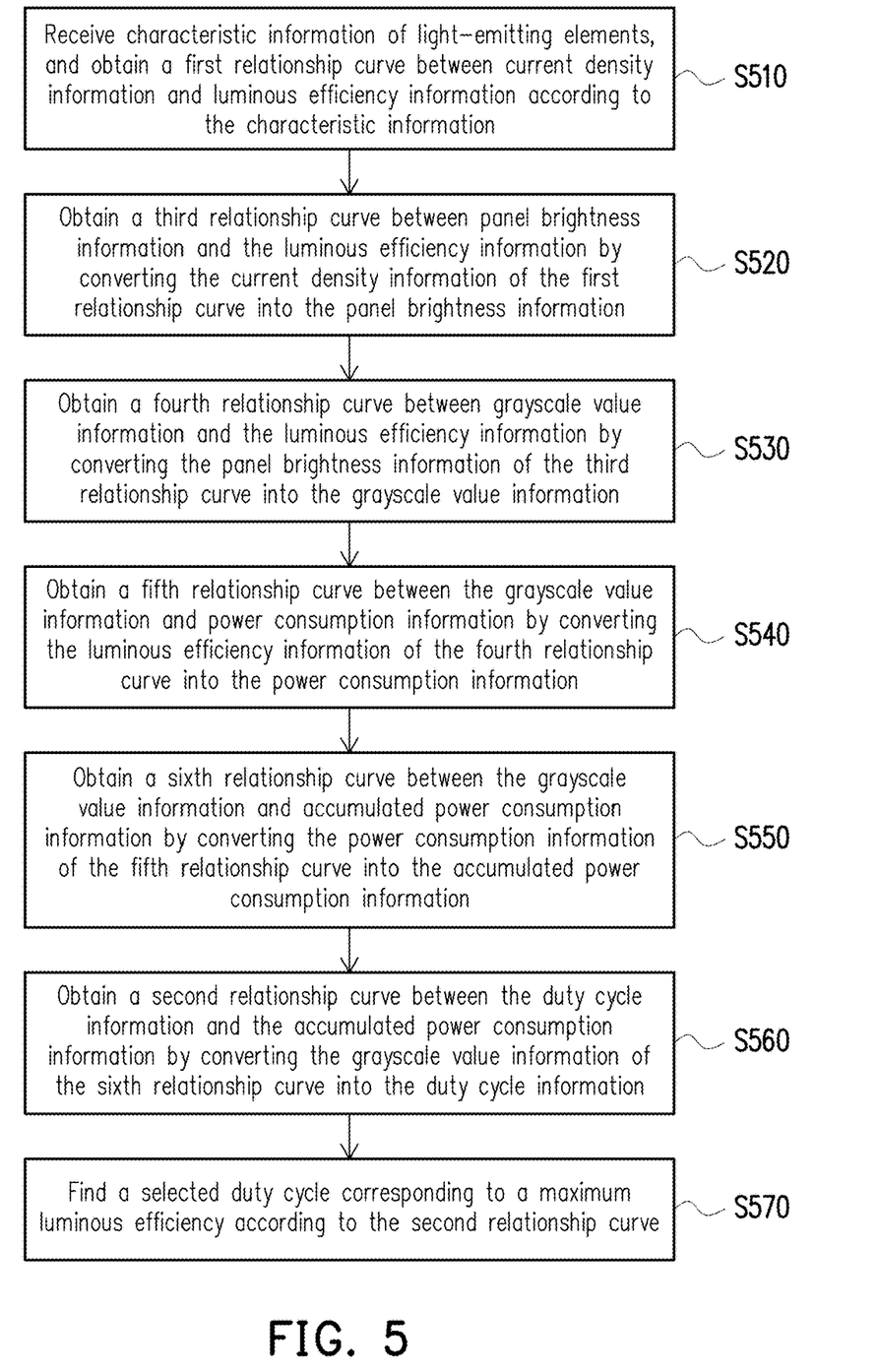
FIG. 5 is a flowchart of an operating method of a controller according to another embodiment of FIG. 1 of the disclosure.

FIG. 5 is a flowchart of an operating method of a controller according to another embodiment of FIG. 1 of the disclosure. Referring to FIG. 1, FIG. 3, FIG. 4A to FIG. 4F and FIG. 5 at the same time, in which step S510 to step S530 and step S570 shown in FIG. 5 may refer to the description of step S310 to step S330 and step S370 in FIG. 3, which will not be repeated.

Different from the embodiment of FIG. 3, in step S540, the controller 120 may convert the luminous efficiency information EC of the fourth relationship curve CR4 into power consumption information PC of the display panel 110, and maintain the grayscale value information GS of the fourth relationship curve CR4 to obtain a fifth relationship curve between the grayscale value information GS and the power consumption information PC. The controller 120 may calculate the power consumption information PC of the display panel 110 in the grayscale state according to a following formula (6):

Then, in step S550, the controller 120 may convert the power consumption information PC of the fifth relationship curve into accumulated power consumption information APC, and maintain the grayscale value information GS of the fifth relationship curve to obtain a sixth relationship curve between the grayscale value information GS and the accumulated power consumption information APC. The controller 120 may calculate the accumulated power consumption information APC of the display panel 110 according to a following formula (7):

$$APC = \Sigma_1^{grayscale\ value\ of\ display\ panel\ displaying\ full\ white} (PC \text{ of display panel in grayscale state}) \quad (7)$$

Then, in step S560, the controller 120 may convert the grayscale value information GS of the sixth relationship curve into the duty cycle information DT, so as to obtain the second relationship curve between the duty cycle information DT and the accumulated power consumption information APC.

According to the above-mentioned embodiments of FIG. 3 and FIG. 5, it is known that the controller 120 may find out the selected duty cycle corresponding to the maximum luminous efficiency of the display panel 110 by converting the relationship curve associated with the characteristic information FI according to the characteristic information FI of the display panel 110. In this way, the driver 130 may drive the display panel 110 according to the selected duty cycle, so as to regulate the light-emitting time of the display panel 110 in the light-emitting phase, thereby improving the luminous efficiency of the display device 100.

Figure 6:
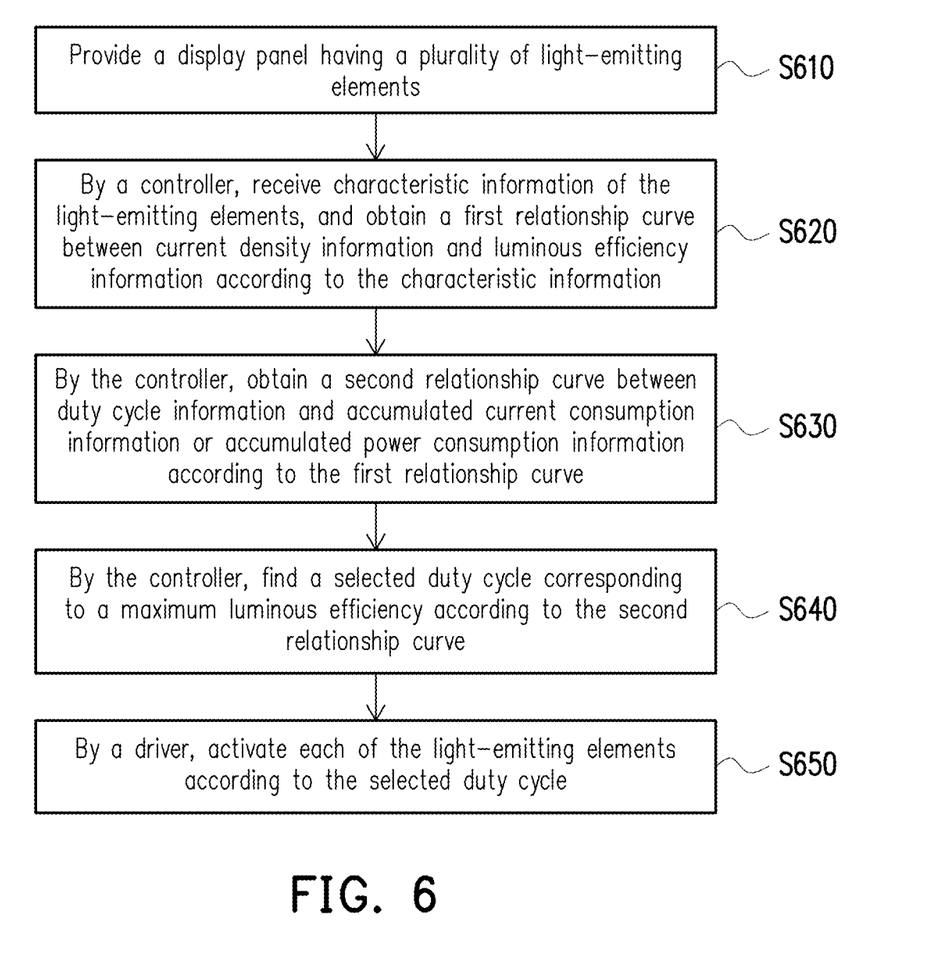
FIG. 6 is a flowchart illustrating a driving method of a display device according to an embodiment of the disclosure.

FIG. 6 is a flowchart illustrating a driving method of a display device according to an embodiment of the disclosure. Referring to FIG. 1 and FIG. 6 at the same time, in step S610, the display device provides a display panel having a plurality of light-emitting elements. In step S620, the display device makes a controller receive characteristic information of the plurality of light-emitting elements, and obtain a first relationship curve between current density information and luminous efficiency information according to the characteristic information. In step 630, the display device makes the controller obtain a second relationship curve between duty cycle information and accumulated current consumption information or accumulated power consumption information according to the first relationship curve.

In step S640, the display device makes the controller find a selected duty cycle corresponding to a maximum luminous efficiency according to the second relationship curve. In step S650, the display device makes the driver activate each light-emitting element according to the selected duty cycle.

Implementation details of each step have been described in detail in the foregoing embodiments and implementations, which will not be repeated.

In summary, in the display device and the driving method thereof according to the embodiments of the disclosure, the controller may find out the selected duty cycle corresponding to the maximum luminous efficiency of the display panel by converting the relationship curve associated with the characteristic information according to the characteristic information of the display panel. In this way, the driver may drive the display panel according to the selected duty cycle, so as to regulate a light-emitting time of the display panel in a light-emitting phase, thereby improving the luminous efficiency of the display device.

What is claimed is:

1. A display device, comprising:
a display panel, comprising a plurality of light-emitting elements;
a controller, coupled to the display panel, wherein the controller is configured to:
receive characteristic information of the light-emitting elements, and obtain a first relationship curve between current density information and luminous efficiency information according to the characteristic information;
obtain a second relationship curve between duty cycle information and accumulated current consumption information or accumulated power consumption information according to the first relationship curve;
find a selected duty cycle corresponding to a maximum luminous efficiency according to the second relationship curve;
obtain a third relationship curve between panel brightness information and the luminous efficiency information by converting the current density information of the first relationship curve into the panel brightness information; and
obtain a fourth relationship curve between grayscale value information and the luminous efficiency information by converting the panel brightness information of the third relationship curve into the grayscale value information; and
a driver, coupled to the controller and the display panel, and activating each of the light-emitting elements according to the selected duty cycle.

2. The display device as claimed in claim 1, wherein the controller is further configured to obtain a fifth relationship curve between the grayscale value information and current consumption information by converting the luminous efficiency information of the fourth relationship curve into the current consumption information.

3. The display device as claimed in claim 2, wherein the controller is further configured to obtain a sixth relationship curve between the grayscale value information and the accumulated current consumption information by converting the current consumption information of the fifth relationship curve into the accumulated current consumption information.

4. The display device as claimed in claim 3, wherein the controller is further configured to obtain the second relationship curve between the duty cycle information and the accumulated current consumption information by converting the grayscale value information of the sixth relationship curve into the duty cycle information.

5. The display device as claimed in claim 1, wherein the controller is further configured to obtain a fifth relationship curve between the grayscale value information and power consumption information by converting the luminous efficiency information of the fourth relationship curve into the power consumption information.

6. The display device as claimed in claim 5, wherein the controller is further configured to obtain a sixth relationship curve between the grayscale value information and the accumulated power consumption information by converting the power consumption information of the fifth relationship curve into the accumulated power consumption information.

7. The display device as claimed in claim 6, wherein the controller is further configured to obtain the second relationship curve between the duty cycle information and the accumulated power consumption information by converting the grayscale value information of the sixth relationship curve into the duty cycle information.

8. A driving method of a display device, comprising:
providing a display panel having a plurality of light-emitting elements;
by a controller, receiving characteristic information of the light-emitting elements, and obtaining a first relationship curve between current density information and luminous efficiency information according to the characteristic information;
by the controller, obtaining a second relationship curve between duty cycle information and accumulated current consumption information or accumulated power consumption information according to the first relationship curve;
by the controller, finding a selected duty cycle corresponding to a maximum luminous efficiency according to the second relationship curve;
by the controller, obtaining a third relationship curve between panel brightness information and the luminous efficiency information by converting the current density information of the first relationship curve into the panel brightness information;
by the controller, obtaining a fourth relationship curve between grayscale value information and the luminous efficiency information by converting the panel brightness information of the third relationship curve into the grayscale value information; and
by a driver, activating each of the light-emitting elements according to the selected duty cycle.

9. The driving method as claimed in claim 8, further comprising:
by the controller, obtaining a fifth relationship curve between the grayscale value information and current consumption information by converting the luminous efficiency information of the fourth relationship curve into the current consumption information.

10. The driving method as claimed in claim 9, further comprising:
by the controller, obtaining a sixth relationship curve between the grayscale value information and the accumulated current consumption information by converting the current consumption information of the fifth relationship curve into the accumulated current consumption information.

11. The driving method as claimed in claim 10, further comprising:
by the controller, obtaining the second relationship curve between the duty cycle information and the accumulated current consumption information by converting the grayscale value information of the sixth relationship curve into the duty cycle information.

12. The driving method as claimed in claim 8, further comprising:
by the controller, obtaining a fifth relationship curve between the grayscale value information and power consumption information by converting the luminous efficiency information of the fourth relationship curve into the power consumption information.

13. The driving method as claimed in claim 12, further comprising:
   by the controller, obtaining a sixth relationship curve between the grayscale value information and the accumulated power consumption information by converting the power consumption information of the fifth relationship curve into the accumulated power consumption information.

14. The driving method as claimed in claim 13, further comprising:
   by the controller, obtaining the second relationship curve between the duty cycle information and the accumulated power consumption information by converting the grayscale value information of the sixth relationship curve into the duty cycle information.

* * * * *